United States Patent
Kronestedt et al.

(10) Patent No.: US 10,560,978 B2
(45) Date of Patent: Feb. 11, 2020

(54) CONTROL PLANE CONNECTIVITY FOR WIRELESS DEVICES

(71) Applicant: TELEFONAKTIEBOLAGET LM ERICSSON (PUBL), Stockholm (SE)

(72) Inventors: Fredric Kronestedt, Bromma (SE); Jacob Österling, Järfälla (SE); Magnus Lundevall, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/068,436

(22) PCT Filed: Feb. 4, 2016

(86) PCT No.: PCT/SE2016/050088
§ 371 (c)(1),
(2) Date: Jul. 6, 2018

(87) PCT Pub. No.: WO2017/135854
PCT Pub. Date: Aug. 10, 2017

(65) Prior Publication Data
US 2019/0037626 A1  Jan. 31, 2019

(51) Int. Cl.
*H04W 76/15* (2018.01)
*H04W 28/08* (2009.01)
(Continued)

(52) U.S. Cl.
CPC ........... *H04W 76/15* (2018.02); *H04W 24/10* (2013.01); *H04W 28/08* (2013.01); *H04W 36/00* (2013.01);
(Continued)

(58) Field of Classification Search
CPC . H04W 24/10; H04W 28/08; H04W 36/0069; H04W 36/72; H04W 76/15
See application file for complete search history.

(56) References Cited

U.S. PATENT DOCUMENTS

2005/0277416 A1* 12/2005 Tolli ................... H04W 36/0094
455/436
2012/0021788 A1* 1/2012 Yavuz ................... H04W 36/30
455/501
(Continued)

FOREIGN PATENT DOCUMENTS

WO  2015/002466 A2  1/2015
WO  2017044018 A1  3/2017

OTHER PUBLICATIONS

Samsung, "Selection of Primary Scheduling Node B in SHO," 3GPP TSG RAN WG1 #37, R1-040492, Montreal, Canada, May 10-14, 2004 (Year: 2004).*
(Continued)

*Primary Examiner* — Michael Thier
*Assistant Examiner* — Brian P Cox
(74) *Attorney, Agent, or Firm* — Patent Portfolio Builders PLLC

(57) ABSTRACT

There is provided mechanisms for assigning control plane connectivity for a wireless device in a dual connectivity supported communications network. The communications network comprises a first network node supporting a group of low frequency bands and a second network node supporting a group of high frequency bands. A method is performed by a control node. The method comprises acquiring an uplink load level for the group of low frequency bands. The method comprises acquiring a first pathloss level between the wireless device and the first network node and a second pathloss level between the wireless device and the second network node. The method comprises selecting, from the acquired uplink load level, the first pathloss level, and the second pathloss level, which one of the first network node and the second network node to provide control plane connectivity for the wireless device.

19 Claims, 4 Drawing Sheets

(51) Int. Cl.
*H04W 24/10* (2009.01)
*H04W 36/22* (2009.01)
*H04W 36/00* (2009.01)

(52) U.S. Cl.
CPC ........ *H04W 36/0069* (2018.08); *H04W 36/22* (2013.01)

(56) References Cited

U.S. PATENT DOCUMENTS

| | | | | |
|---|---|---|---|---|
| 2012/0106346 | A1* | 5/2012 | Aguirre | H04W 28/08 370/237 |
| 2014/0293858 | A1* | 10/2014 | Kalhan | H04W 36/0072 370/311 |
| 2015/0079988 | A1* | 3/2015 | Su | H04W 36/30 455/436 |
| 2015/0358863 | A1* | 12/2015 | Yamamoto | H04W 76/15 370/331 |
| 2016/0021592 | A1 | 1/2016 | Vesely et al. | |
| 2016/0095070 | A1* | 3/2016 | Brisebois | H04W 52/242 370/252 |
| 2016/0219475 | A1 | 7/2016 | Kim | |
| 2017/0311217 | A1* | 10/2017 | Jung | H04W 36/04 |
| 2019/0124658 | A1* | 4/2019 | Wilhelmsson | H04L 5/00 |

OTHER PUBLICATIONS

International Search Report and Written Opinion, dated Oct. 13, 2016, from corresponding PCT Application No. PCT/SE2016/050088.

\* cited by examiner

CONTROL PLANE CONNECTIVITY FOR WIRELESS DEVICES

TECHNICAL FIELD

Embodiments presented herein relate to a method, a control node, a computer program, and a computer program product for assigning control plane connectivity for a wireless device in a dual connectivity supported communications network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to provide network access in a broad range of frequency bands. It is foreseen that evolving radio access technologies (RATs) likely include operation in very high frequency bands, for example in the range 4-100 GHz. Long Term Evolution (LTE) radio access typically uses multiple frequency bands from both low frequency bands (e.g. 700-900 MHz) and high frequency bands (e.g. 1000-3500 MHz). The available bandwidth is commonly more limited in the lower frequency bands compared to in the higher frequency bands and the very high frequency bands. It is common that a network operator is allowed to allocate resources in both low frequency bands and high frequency bands. Today, the low frequency bands are well suited for providing network coverage at high distances between serving radio access network node and served wireless device and in indoor environments (where network coverage is provided by outdoor network nodes) due to better propagation characteristics than high frequency bands, whilst high frequency bands provide network coverage at shorter distances but with higher capacity than low frequency bands due to the larger bandwidth.

Dual connectivity has been specified for LTE and can be used to aggregate data flows from multiple radio access nodes in order to increase bandwidth when scheduling data for a wireless device. Dual connectivity was introduced in LTE Release 12 for inter frequency deployments, i.e., where two network nodes operate on separate frequencies in independent manner. A wireless device in dual connectivity, according to LTE Release 12, maintains simultaneous connections to a Master evolved Node B (MeNB) and at least one Secondary evolved Node B (SeNB) node. As the name indicates, the MeNB terminates the control plane connection towards the served wireless device and thus acts as the controlling node of the wireless device. In addition to the MeNB, the wireless device may be connected to at least one SeNB for added user plane support. By letting the wireless device transmit and receive data to and from two eNBs (one MeNB and one SeNB) at the same time, peak bit rates in the network can be increased by utilizing both frequency layers. By splitting the data higher up in the protocol stack (when compared to carrier aggregation), non-ideal backhaul and independent scheduling in the network node is supported. Further, the control plane and the user plane can be separated between different network nodes where the MeNB is responsible for the control plane connectivity and the SeNB is responsible for the user plane connectivity. In this case, user plane data can thus be offloaded to the SeNB, whilst the control plane signalling in maintained by the MeNB.

One approach for securing the control plane connectivity is to use dual connectivity between low frequency bands and high frequency bands and targeting the control plane connectivity for the low frequency bands (i.e. making a separation of the control plane and the data plane as disclosed above). One issue with this approach is that the low frequency bands may be overloaded if this approach always is used. On the other hand, for comparatively small data transfers it can be unnecessary to set up a connection to a SeNB. Therefore it is also important to balance load between MeNB.

Hence, there is still a need for an improved load balancing between network nodes in a dual connectivity supported communications networks.

SUMMARY

An object of embodiments herein is to provide efficient load balancing between network nodes in a dual connectivity supported communications networks.

According to a first aspect there is presented a method for assigning control plane connectivity for a wireless device in a dual connectivity supported communications network. The communications network comprises a first network node supporting a group of low frequency bands and a second network node supporting a group of high frequency bands. The method is performed by a control node. The method comprises acquiring an uplink load level for the group of low frequency bands. The method comprises acquiring a first pathloss level between the wireless device and the first network node and a second pathloss level between the wireless device and the second network node. The method comprises selecting, from the acquired uplink load level, the first pathloss level, and the second pathloss level, which one of the first network node and the second network node to provide control plane connectivity for the wireless device.

According to a second aspect there is presented a control node for assigning control plane connectivity for a wireless device in a dual connectivity supported communications network. The communications network comprises a first network node supporting a group of low frequency bands and a second network node supporting a group of high frequency bands. The control node comprises processing circuitry. The processing circuitry is configured to cause the control node to acquire an uplink load level for the group of low frequency bands. The processing circuitry is configured to cause the control node to acquire a first pathloss level between the wireless device and the first network node and a second pathloss level between the wireless device and the second network node. The processing circuitry is configured to cause the control node to select, from the acquired uplink load level, the first pathloss level, and the second pathloss level, which one of the first network node and the second network node to provide control plane connectivity for the wireless device.

According to a third aspect there is presented a control node for assigning control plane connectivity for a wireless device in a dual connectivity supported communications network. The communications network comprises a first network node supporting a group of low frequency bands and a second network node supporting a group of high frequency bands. The control node comprises processing circuitry and a computer program product. The computer program product stores instructions that, when executed by the processing circuitry, causes the control node to perform a step of operations, or steps. The operations, or steps, cause the control node to acquire an uplink load level for the group of low frequency bands. The operations, or steps, causes the control node to acquire a first pathloss level between the wireless device and the first network node and a second pathloss level between the wireless device and the second network node. The operations, or steps, causes the control node to select, from the acquired uplink load level, the first pathloss level, and the second pathloss level, which one of the first network node and the second network node to provide control plane connectivity for the wireless device.

According to a fourth aspect there is presented a control node for assigning control plane connectivity for a wireless device in a dual connectivity supported communications network. The communications network comprises a first network node supporting a group of low frequency bands and a second network node supporting a group of high frequency bands. The control node comprises an acquire module configured to acquire an uplink load level for the group of low frequency bands. The control node comprises an acquire module configured to acquire a first pathloss level between the wireless device and the first network node and a second pathloss level between the wireless device and the second network node. The control node comprises a select module configured to select, from the acquired uplink load level, the first pathloss level, and the second pathloss level, which one of the first network node and the second network node to provide control plane connectivity for the wireless device.

According to a fifth aspect there is presented a computer program for assigning control plane connectivity for a wireless device in a dual connectivity supported communications network. The communications network comprises a first network node supporting a group of low frequency bands and a second network node supporting a group of high frequency bands, the computer program comprising computer program code which, when run on a control node, causes the control node to perform a method according to the first aspect.

According to a sixth aspect there is presented a computer program product comprising a computer program according to the third aspect and a computer readable storage medium on which the computer program is stored. According to an embodiment the computer readable storage medium is a non-transitory computer readable storage medium.

Advantageously this method, control node, and computer program provide efficient assignment of control plane connectivity for a wireless device in a dual connectivity supported communications network. In turn, this solves the need for efficient load balancing between network nodes in a dual connectivity supported communications networks.

Advantageously this method, control node, and computer program provide mobility robustness for radio access technologies utilizing the group of high frequency bands and better throughput and capacity for radio access technologies utilizing the group of low frequency bands in dual connectivity scenarios.

Advantageously this method, control node, and computer program enables co-existence and efficient load balancing between radio access technologies utilizing the group of high frequency bands and radio access technologies utilizing the group of low frequency bands in dual connectivity scenarios.

It is to be noted that any feature of the first, second, third, fourth, fifth and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise to herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
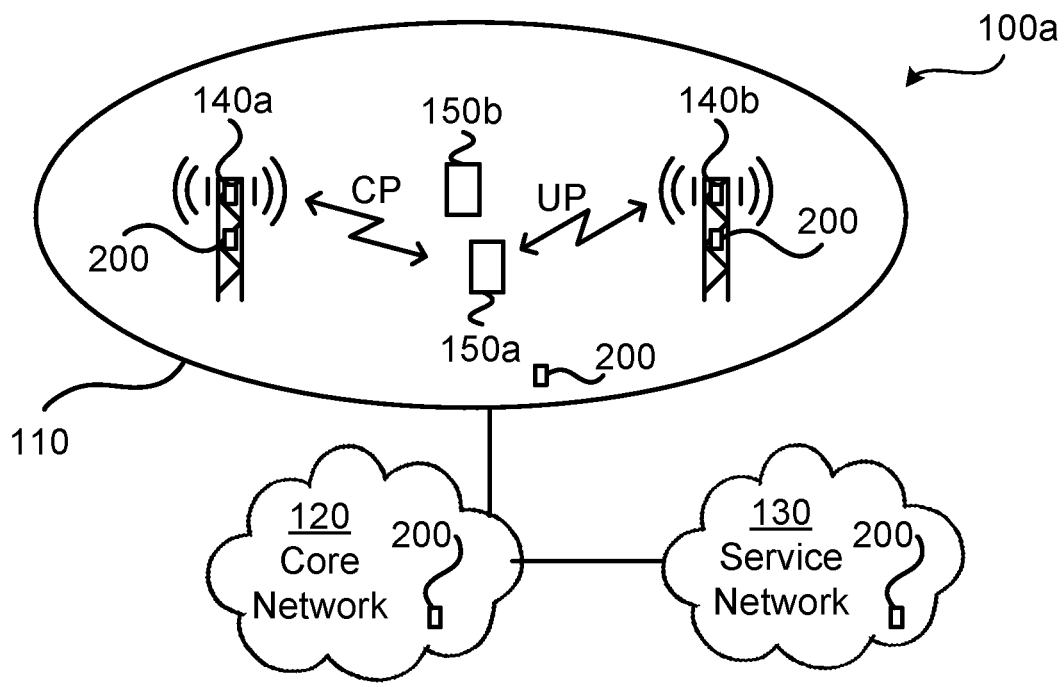
FIGS. 1a and 1b are schematic diagrams illustrating communications networks according to embodiments.
Figure 1B:
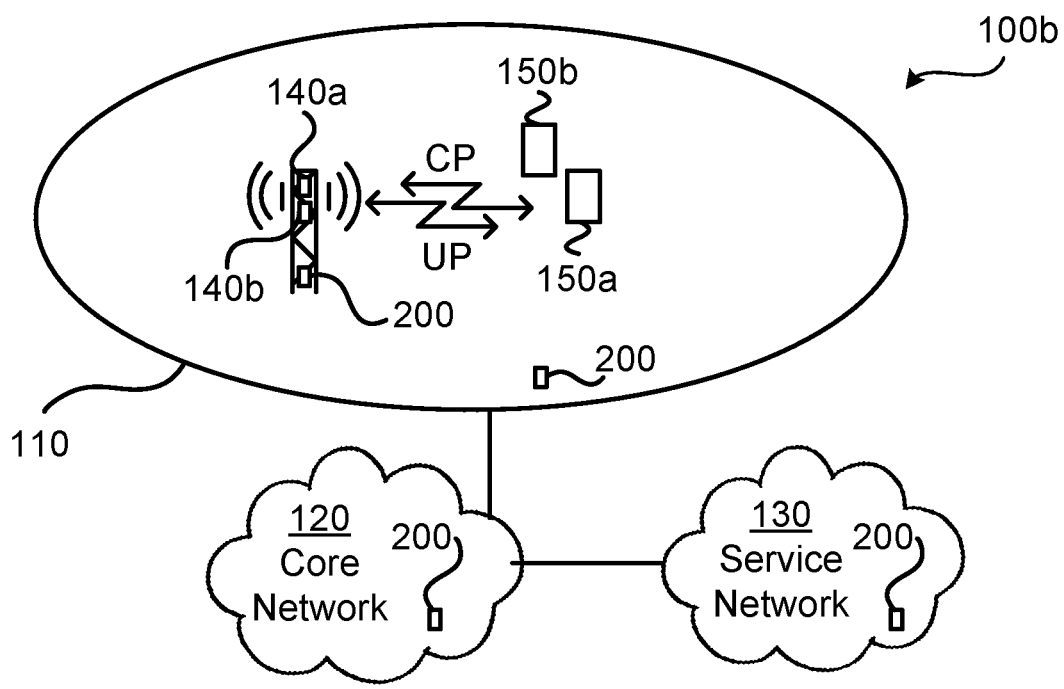

FIGS. 1a and 1b are schematic diagrams illustrating communications networks 100a, 100b where embodiments presented herein can be applied. Each communications network 100a, 100b comprises a radio access network 110, a core network 120, and a service network 130.

The radio access network 110 comprises radio access network nodes 140a, 140b configured to provide network coverage to wireless devices 150a, 150b. As understood by the skilled person the communications network 100 may comprise a plurality of such radio access network nodes 140a, 140b, each providing network coverage to wireless devices 150a, 150b. Each radio access network node 140a, 140b can be provided as a radio base station, base transceiver station, Node B, evolved Node B, or other wireless access point.

Each wireless device 150a, 150b can be provided as a mobile station, mobile phone, handset, wireless local loop phone, user equipment (UE), smartphone, laptop computer, tablet computer, wireless modem, or network equipped sensor.

The radio access network 110 is operatively connected to the core network 120 which in turn is operatively connected to the service network 130. The wireless devices 150a, 150b are thereby enabled to access services and exchange data with the service network 130.

Each communications network 100a, 100b further comprises at least one control node 200. FIGS. 1a and 1b schematically illustrate different locations of the control node 200. For example, a control node 200 may be co-located with a radio access network node 140a, 140b, be provided as a separate entity in the radio access network 110, as an entity in the core network 120 and/or as an entity in the service network 130. Further description of the control node 200 will be provided below.

The communications networks 100a, 100b are assumed to support dual connectivity. Denote one of the radio access network nodes 140a, 140b as a first radio access network node 140a and another one of the radio access network nodes 140a, 140b as a second radio access network node 140b.

Control plane (CP) connectivity to each of the wireless devices 150a, 150b is provided by one of the network nodes 140a, 140b. In this respect one of the network nodes 140a, 140b could provide control plane connectivity to at least one wireless device 150a, 150b and hence the wireless devices 150a, 150b could be provided control plane connectivity by the same or different network nodes 140a, 140b. In the non-limiting illustrative example of FIGS. 1a and 1b network node 140a provides control plane connectivity to both wireless devices 150a, 150b.

User plane (UP) connectivity to each of the wireless devices 150a, 150b is provided by one of the network nodes 140a, 140b. In this respect one of the network nodes 140a, 140b could provide user plane connectivity to at least one wireless device 150a, 150b and hence the wireless devices 150a, 150b could be provided user plane connectivity by the same or different network nodes 140a, 140b. In the non-limiting illustrative example of FIGS. 1a and 1b network node 140b provides user plane connectivity to both wireless devices 150a, 150b.

In general terms, control plane connectivity and user plane connectivity to a given wireless device 150a, 150b could be provided by the same or different network nodes 140a, 140b.

Figure 6:
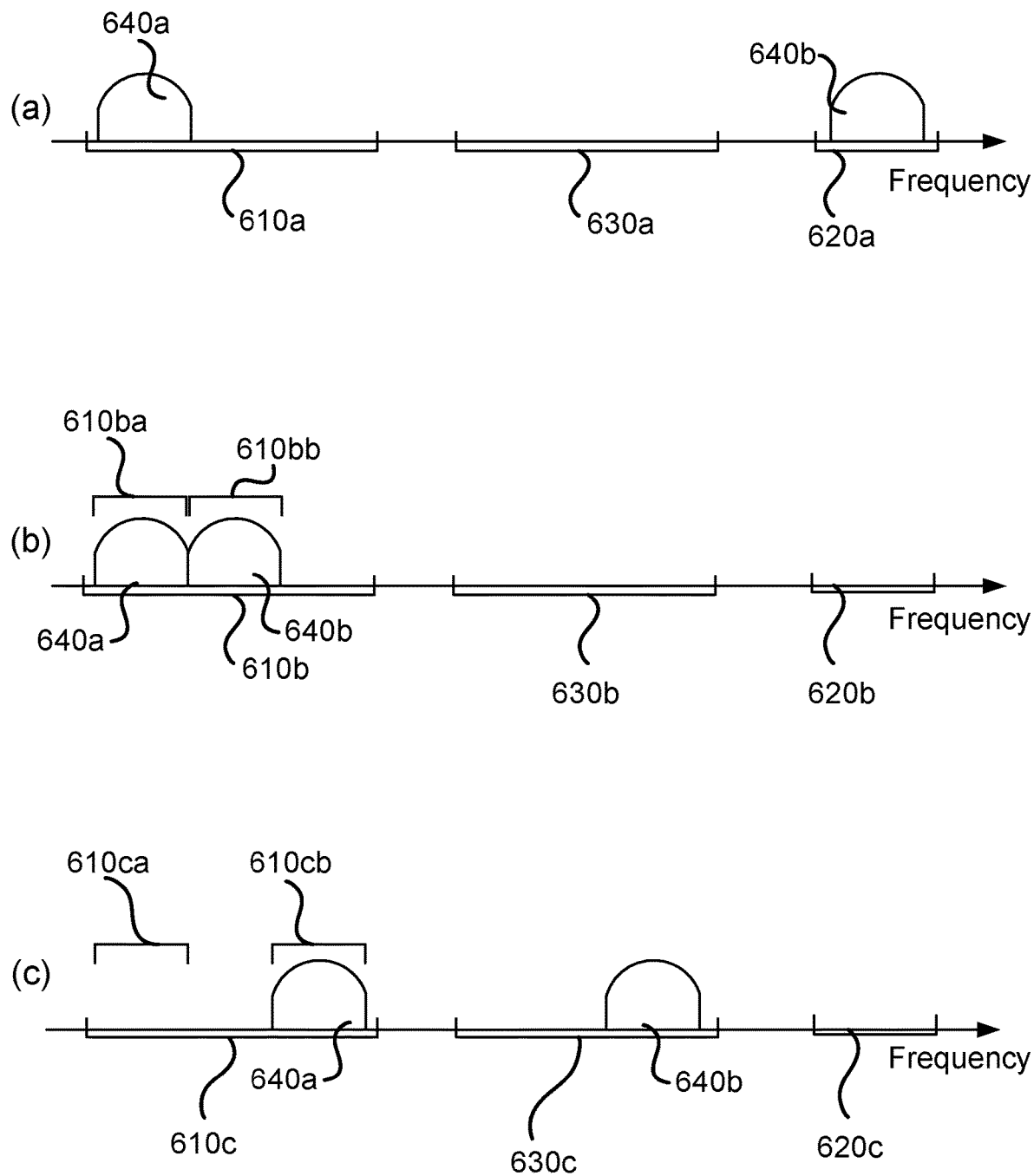
FIG. 6 schematically illustrates placement of carriers in frequency bands according to embodiments.

The first radio access network node 140a provides network access in a group of low frequency bands 610a, 610b, 610c and the second radio access network node 140b provides network access in a group of high frequency bands 620a, 620b, 620c, see FIG. 6. FIG. 6 schematically illustrates the group of low frequency bands 610a, 610b, 610c, the group of high frequency bands 620a, 620b, 620c, and a group of mid frequency bands 630a, 630b, 630c along a frequency axis according to three illustrative scenarios (a), (b), (c). In some embodiments the group of mid frequency bands 630a, 630b, 630c belong to either the group of low frequency bands 610a, 610b, 610c or to the group of high frequency bands 620a, 620b, 620c. At 640a is illustrated the frequency allocation of the first network node 140a and at 640b is illustrated the frequency allocation of the second network node 140b. As illustrated in the three illustrative scenarios (a), (b), (c), the frequency allocation 640a and the frequency allocation 640b may be in the same given frequency band (such as in the low frequency band 610b or as in the low frequency band 610). However, as will be further disclosed below, any given frequency band can in turn be divided into a low frequency band and a high frequency band. In the illustrative example of FIG. 6, the frequency band 610b has been divided into a low frequency band 610ba and a high frequency band 610bb, and the frequency band 610c has been divided into a low frequency band 610ca and a high frequency band 610cb. As an illustrative example, a network operator may use frequency bands centred around 900 MHz, 1800 MHz, 2100 MHz, 2600 MHz, and 3500 MHz. Then, for this network operator the frequency band centred around 900 MHz could define a low frequency band, the frequency bands centred around 1800 MHz, 2100 MHz and 2600 MHz could define a mid frequency band, and the frequency band centred around 3500 MHz could define a high frequency band. Another network operator may use frequency bands centred around 800 MHz, 2600 MHz, 4500 MHz, and 28000 MHz. Then, for this network operator the frequency band centred around 800 MHz could define a low frequency band, the frequency bands centred around 2600 MHz and 4500 MHz could define a mid frequency band, and the frequency band centred around 28000 MHz could define a high frequency band.

The group of low frequency bands 610a, 610b, 610c can be associated with a first radio access technology (RAT) and the group of high frequency bands 620a, 620b, 620c can be associated with a second RAT different from the first RAT. Hence, the first radio access network node 140a can provide network access, and thus operate, using the first RAT, and the second radio access network node 140b can provide network access, and thus operate, using the second RAT. In this respect, one example of the first RAT is Long Term Evolution (LTE) radio access. In general terms, as disclosed above, the communications network 100a, 100b may further comprise a group of mid frequency bands 630a, 630b, 630c.

When using dual connectivity, at least one of the first network node 140a and the second network node 140b may simultaneously provide control plane (CP) connectivity for at least one wireless device 150a and data plane connectivity for at least one other wireless device 150b. Additionally or alternatively, the one of the first network node 140a and the second network node 140b that is not selected to provide control plane connectivity to the wireless device 150a, 150b is selected to provide user plane (UP) connectivity to the wireless device 150a, 150b.

According to some aspects, the one of the first network node 140a and the second network node 140b that is selected to provide control plane connectivity to the wireless device 150a, 150b is denoted Master evolved Node B (MeNB) and the other of the first network node 140a and the second network node 140b is denoted Secondary evolved Node B (SeNB).

In the communications network 100b the radio access network nodes 140a, 140b are co-located (and may hence share hardware components, such as baseband signal processing resources or radio heads), whereas in the communications network 100a the radio access network nodes 140a, 140b are provided at different locations (and therefore do not share hardware components, such as baseband signal processing resources or radio heads).

In a communications network 100a, 100b supporting dual connectivity using multiple frequency bands (such as a group of low frequency bands 610a, 610b, 610c and a group of high frequency bands 620a, 620b, 620c), there may be different ways to select which one of the first network node 140a and the second network node 140b to provide control plane connectivity for the wireless device 150a, 150b.

In idle mode, the wireless device 150a, 150b typically selects its serving cell (i.e., the radio access network node providing control plane connectivity) based on signal strength. In connected mode, the radio access network 110 commonly determines which of the radio access network nodes to act as serving cell based on measurements from the wireless device 150a, 150b. However, this can lead to signalling overhead in the group of low frequency bands 610a, 610b, 610c and not providing secure mobility robustness when only low frequency bands 610a, 610b, 610c are used for control plane connectivity.

The embodiments disclosed herein relate to mechanisms for assigning control plane connectivity for a wireless device 150a, 150b in a dual connectivity supported communications network 100a, 100b. In order to obtain such mechanisms there is provided a control node 200, a method performed by the control node 200, a computer program product comprising code, for example in the form of a computer program, that when run on a control node 200, causes the control node 200 to perform the method.

Figure 4:
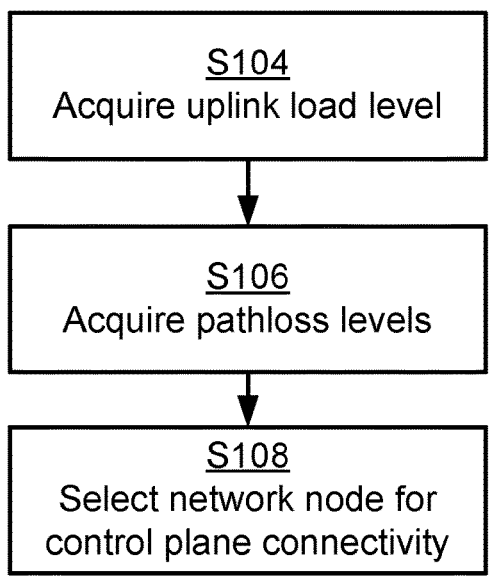
FIGS. 4 and 5 are flowcharts of methods according to embodiments.
Figure 5:
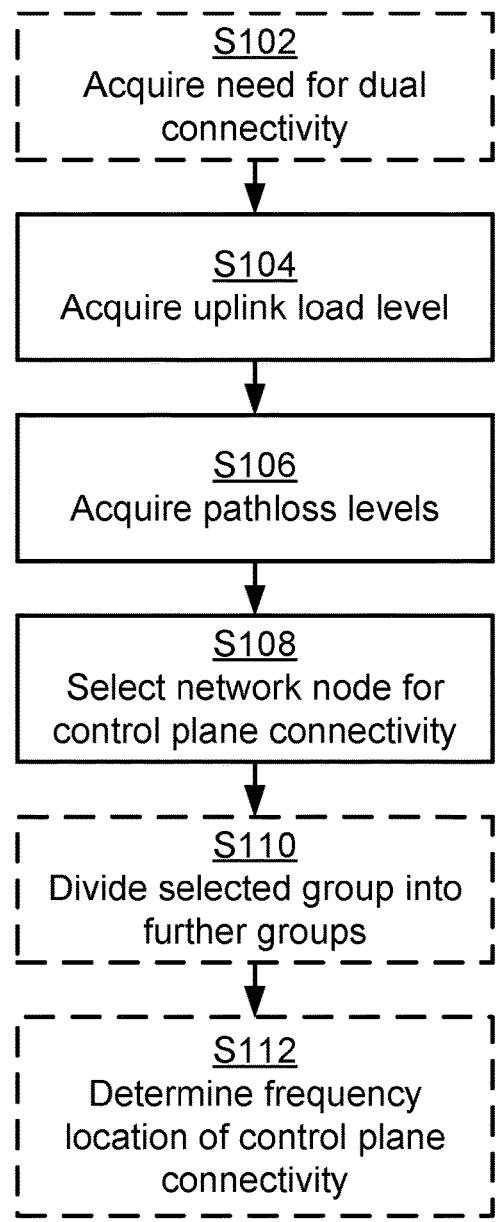

FIGS. 4 and 5 are flow charts illustrating embodiments of methods for assigning control plane connectivity for a wireless device 150a, 150b in a dual connectivity supported communications network 100a, 100b. The methods are performed by the control node 200. The methods are advantageously provided as computer programs 320.

Reference is now made to FIG. 4 illustrating a method for assigning control plane connectivity for a wireless device 150a, 150b in a dual connectivity supported communications network 100a, 100b as performed by the control node 200 according to an embodiment.

As disclosed above, the communications network 100a, 100b comprises a first network node 140a supporting a group of low frequency bands 610a, 610b, 610c and a second network node 140b supporting a group of high frequency bands 620a, 620b, 620c.

Which one of the first network node 140a and the second network node 140b to provide control plane connectivity for the wireless device 150a, 150b is selected based on uplink load level in the communications network 100a, 100b. Hence, the control node 200 is configured to perform step S104:

S104: The control node 200 acquires an uplink load level for the group of low frequency bands 610a, 610b, 610c.

Which one of the first network node 140a and the second network node 140b to provide control plane connectivity for the wireless device 150a, 150b is further based on pathloss levels in the communications network 100a, 100b. Hence, the control node 200 is configured to perform step S106:

S106: The control node 200 acquires a first pathloss level between the wireless device 150a, 150b and the first network node 140a. The control node 200 acquires a second pathloss level between the wireless device 150a, 150b and the second network node 140b.

Which one of the first network node 140a and the second network node 140b to provide control plane connectivity for the wireless device 150a, 150b is then determined by the control node 200 performing step S108:

S108: The control node 200 selects, from the acquired uplink load level, the first pathloss level, and the second pathloss level, which one of the first network node 140a and the second network node 140b to provide control plane connectivity for the wireless device 150a, 150b.

This method can avoid signaling overload of the group of low frequency bands 610a, 610b, 610c and secure mobility robustness.

Embodiments relating to further details of assigning control plane connectivity for a wireless device 150a, 150b in a dual connectivity supported communications network 100a, 100b will now be disclosed.

There may be different examples of uplink load level. For example, the uplink load level may represent an uplink interference level, an uplink resource utilization level, an uplink traffic throughput level, processing load for handling uplink traffic, or any combination thereof.

There may be different examples of how the uplink load level may be measured. For example, a measure of the uplink load level can be how many of the available uplink radio resources that are occupied. That is, the uplink load level may represent the number of available uplink radio resources in the group of low frequency bands 610a, 610b, 610c that are occupied. Further, the uplink load level may be determined based on uplink throughput statistics in the communications network 100a, 100b.

The uplink load level may be measured for an uplink control channel and/or uplink data channel, such as an uplink data channel used for transmission of acknowledgement messages. One example of acknowledgement messages is Transmission Control Protocol acknowledgement messages; both ACK messages and NACK messages. That is, the uplink load level may be for an uplink control channel, an uplink data channel used for transmission of acknowledgement messages, or any combination thereof.

There may be different examples of pathloss levels to be considered. For example, the pathloss of the first network node 140a and the pathloss of the second network node 140b can be estimated by the control node 200 in the uplink or from downlink measurements reports received from the wireless devices 150a, 150b. That is, the pathloss levels may be derived from uplink measurements, downlink measurements reports received from the wireless device 150a, 150b, or any combination thereof. Further, the pathloss levels may be estimated during a handover evaluation process. That is, the downlink measurements report may be part of a handover evaluation process of the wireless device 150a, 150b or measurements may be triggered separately. The pathloss levels may be determined for the group of low frequency bands 610a, 610b, 610c, from the group of high frequency bands 620a, 620b, 620c, or any combination thereof.

There may be different ways to determine which frequency bands to include in the group of low frequency bands 610a, 610b, 610c and which frequency bands to include in the group of high frequency bands 620a, 620b, 620c. According to an embodiment, frequency bands located lower than 1 GHz belong to the group of low frequency bands 610a, 610b, 610c and frequency bands located at 4 GHz or higher belong to the group of high frequency bands 620a, 620b, 620c. However, as the skilled person understands, these frequency threshold between the group of low frequency bands 610a, 610b, 610c and the group of high frequency bands 620a, 620b, 620c may be set differently, for example depending on which frequency bands that are available.

Further, frequency bands located from 1 GHz to 4 GHz may either belong to the group of low frequency bands 610a, 610b, 610c or to the group of high frequency bands 620a, 620b, 620c. In general terms, the communications network 100a, 100b may further comprise a group of mid frequency bands 630a, 630b, 630c (as in FIG. 6) and hence there may be two frequency thresholds in order to separate the group of mid frequency bands 630a, 630b, 630c from the group of low frequency bands 610a, 610b, 610c and the group of high frequency bands 620a, 620b, 620c. According to an embodiment, frequency bands located from 1 GHz to 4 GHz belong to the group of mid frequency bands 630a, 630b, 630c.

In some embodiment each frequency band in the group of mid frequency bands 630a, 630b, 630c is merged with one of the group of low frequency bands 610a, 610b, 610c and the group of high frequency bands 620a, 620b, 620c, respectively. In other embodiments this group of mid frequency bands 630a, 630b, 630c is discarded when selecting which one of the first network node 140a and the second network node 140b to provide control plane connectivity for the wireless device 150a, 150b. Further, as will be further disclosed below, a group of frequency bands may in turn be split into two (sub-)groups of frequency bands.

There may be different ways for the control node 200 to select, from the acquired uplink load level and pathloss levels, which one of the first network node 140a and the second network node 140b to provide control plane connectivity for the wireless device 150a, 150b, as in step S108. Different embodiments relating thereto will now be described in turn.

If the load of the group of low frequency bands is low enough, the control plane connectivity is assigned to the network node employing the group of lowest frequency bands. Hence, according to an embodiment, the first network node 140a is selected to provide the control plane connectivity when the uplink load level for the group of low frequency bands 610a, 610b, 610c is below a first predetermined level.

Further, if the load of the group of low frequency band is not low enough, which one of the first network node 140a and the second network node 140b to provide control plane connectivity for the wireless device 150a, 150b is determined based on the pathloss levels between wireless device 150a, 150 and each of the first network node 140a and the second network node 140b. Hence, according to an embodiment, which one of the first network node 140a and the second network node 140b to provide control plane connectivity is selected based on the first pathloss level and the second pathloss level when the uplink load level for the group of low frequency bands 610a, 610b, 610c is above a first predetermined level. In this embodiment which one of the first network node 140a and the second network node 140b to provide control plane connectivity is no longer based on the actual uplink load level.

Further, the network node employing the high group of frequency bands can be selected to provide control plane connectivity for the wireless device 150a, 150b if the pathloss level between the wireless device 150a, 150b and this network node is smaller than a predetermined pathloss limit. Hence, according to an embodiment, the second network node 140b is selected to provide the control plane connectivity when the second pathloss level is below a second predetermined level.

Further, the network node employing the group of low frequency bands can be selected to provide control plane connectivity for the wireless device 150a, 150b if the smallest of the pathloss levels is larger than the predetermined pathloss limit. Hence, according to an embodiment, the first network node 140a is selected to provide the control plane connectivity when the first pathloss level and the second pathloss level both are above a second predetermined level.

Further, a random selection between the network nodes 140a, 140b to provide control plane connectivity for the wireless device 150a, 150b can be made if the pathloss levels between the wireless device 150a, 150a and each network node 140a, 140b are smaller than a second pathloss limit. Hence, according to an embodiment, in which one of the first network node 140a and the second network node 140b to provide control plane connectivity is randomly selected when the first pathloss level and the second pathloss level both are below a second predetermined level.

There may be different ways to determine the first predetermined level and the second predetermined level, respectively. Different embodiments relating thereto will now be described in turn.

According to an embodiment the first predetermined level is selected, or tuned, based on uplink performance statistics in the communications network 100a, 100b such as throughput, radio resource utilization of the control plane, the user plane, and/or processing resources. This could be the medium or average throughput etc. or any other percentile of throughput etc., over many load situations, depending on the desired target (e.g. cell edge or median throughput). That is, the first predetermined level may be based on uplink performance statistics in the communications network 100a, 100b. The load of at least the group of low frequency bands 610a, 610b, 610c can therefore be monitored.

According to an embodiment the second predetermined limit is determined, or tuned, in a similar way as the first predetermined limit by observing and analyzing uplink performance statistics in the communications network 100a, 100b whilst varying the second predetermined limit. This determination, or tuning, is not load dependent. That is, the second predetermined level may be based on uplink performance statistics in the communications network in the communications network 100a, 100b, where this uplink performance statistics is not load dependent. For this purpose, the network nodes 140a, 140b could either order the wireless device 150a, 150b to report signal strength(s) of connected network node(s) 140a, 140b or estimate this from uplink measurements of signals from the wireless device 150a, 150b.

According to an embodiment at least one of the first predetermined limit and the second predetermined limit is determined based on widths of the groups of frequency bands. For this purpose it is assumed that the group of low frequency bands 610a, 610b, 610c has a first bandwidth, and that the group of high frequency bands 620a, 620b, 620c has a second bandwidth. At least one of the first predetermined level and the second predetermined level is then based on a ratio of the first bandwidth and the second bandwidth. This would enable the portion of wireless devices 150a, 150b having the control plane connectivity in the group of low frequency bands 610a, 610b, 610c being similar to the portion of the total available bandwidth (i.e., the total bandwidth occupied by the group of low frequency bands 610a, 610b, 610c, the group of high frequency bands 620a, 620b, 620c, and if available the group of mid frequency bands 630a, 630b, 630c) occupied by the group of low frequency bands 610a, 610b, 610c.

According to an embodiment at least one of the first predetermined level and the second predetermined level can be set such that half of all wireless devices 150a, 150b collectively served by the network nodes 140a, 140b have control plane connectivity to the first network node 140a whilst the other half of all wireless devices 150a, 150b collectively served by the network nodes 140a, 140b have control plane connectivity to the second network node 140b.

For those wireless device 150a, 150 that are assigned a new network node 140a, 140b for control plane connectivity this change of network node 140a, 140b can be performed as a conventional inter-frequency handover in connected mode.

Reference is now made to FIG. 5 illustrating methods for assigning control plane connectivity for a wireless device 150a, 150b in a dual connectivity supported communications network 100a, 100b as performed by the control node 200 according to further embodiments. It is assumed that steps S104, S106, and S108 are performed as disclosed above.

There can be different reasons for the control node 200 to acquire the uplink load level.

For example, the control node 200 can acquire a need for dual connectivity for the wireless device 150a, 150b and then acquire the uplink load level as in step S104. The control node 200 can hence be configured to perform step S102:

S102: The control node 200 acquires a need for dual connectivity for the wireless device 150a, 150b. The uplink load level as acquired in step S104 is then acquired in response to the control node 200 having acquired the need for dual connectivity.

Further, the selection of which one of the first network node 140a and the second network node 140b to provide control plane connectivity for the wireless device 150a, 150b can be performed during dual connectivity of the wireless device 150a, 150b, or as part of setting up dual connectivity for the wireless device 150a, 150b.

The selection of which one of the first network node 140a and the second network node 140b to provide control plane connectivity can be performed in an iterative manner. That is, according to an embodiment which one of the first network node 140a and the second network node 140b to provide control plane connectivity for the wireless device 150a, 150b is iteratively selected.

One example of such an iterative procedure for selecting which one of the first network node 140a and the second network node 140b to provide control plane connectivity for the wireless device 150a, 150b will now be described. However, as the skilled person understands, there may be other iterative procedures for selecting which one of the first network node 140a and the second network node 140b to provide control plane connectivity for the wireless device 150a, 150b. In brief, the selected group of frequency bands (as selected in step S108) may in turn divided into a new group of low frequency bands and new group of high frequency bands.

In more detail, according to an embodiment the selecting in step S108 further involves the control node 200 to perform steps S110 and S112:

S110: The control node 200 divides the group of frequency bands for the selected network node into a further group of low frequency bands and a further group of high frequency bands.

In the illustrative example of FIG. 6, the frequency band 610b has been divided into a low frequency band 610ba and a high frequency band 610bb, and the frequency band 610c has been divided into a low frequency band 610ca and a high frequency band 610cb.

S112: The control node 200 determines, from the acquired uplink load level and pathloss level of the selected network node, which of the further group of low frequency bands and the further group of high frequency bands to utilize for providing the control plane connectivity for the wireless device 150a, 150b.

Figure 2A:
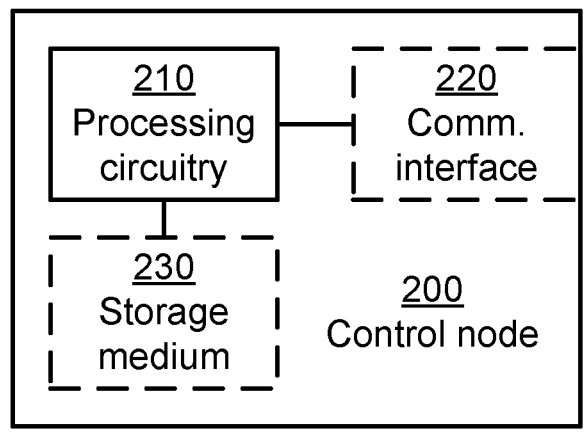
FIG. 2a is a schematic diagram showing functional units of a control node according to an embodiment.

FIG. 2a schematically illustrates, in terms of a number of functional units, the components of a control node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 3), e.g. in the form of a storage medium 230. The processing circuitry 210 may further be provided as at least one application specific integrated circuit (ASIC), or field programmable gate array (FPGA).

Particularly, the processing circuitry 210 is configured to cause the control node 200 to perform a set of operations, or steps, S102-S112, as disclosed above. For example, the storage medium 230 may store the set of operations, and the processing circuitry 210 may be configured to retrieve the set of operations from the storage medium 230 to cause the control node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control node 200 may further comprise a communications interface 220 at least configured for communications at least with the first network node 140a and the second network node 140b. As such the communications interface 220 may comprise one or more transmitters and receivers, comprising analogue and digital components. The processing circuitry 210 controls the general operation of the control node 200 e.g. by sending data and control signals to the communications interface 220 and the storage medium 230, by receiving data and reports from the communications interface 220, and by retrieving data and instructions from the storage medium 230. Other components, as well as the related functionality, of the control node 200 are omitted in order not to obscure the concepts presented herein.

Figure 2B:
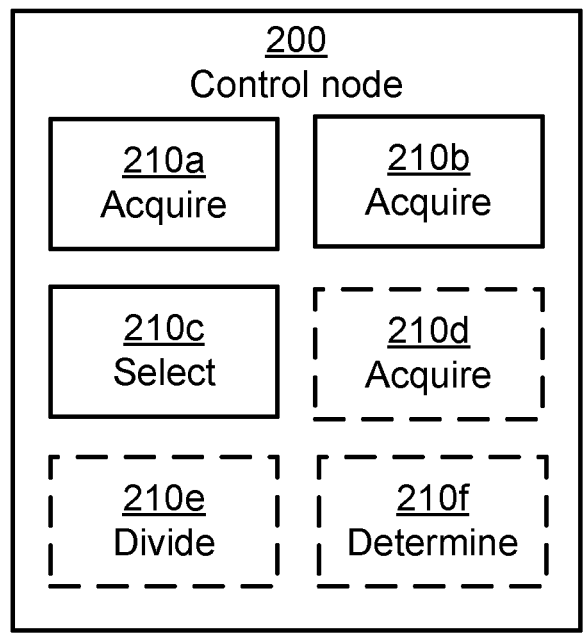
FIG. 2b is a schematic diagram showing functional modules of a control node according to an embodiment.

FIG. 2b schematically illustrates, in terms of a number of functional modules, the components of a control node 200 according to an embodiment. The control node 200 of FIG. 2b comprises a number of functional modules; an acquire module 210a configured to perform step S104, an acquire module 210b configured to perform step S106, and a select module 210c configured to perform step S108. The control node 200 of FIG. 2b may further comprises a number of optional functional modules, such as any of an acquire module 210d configured to perform step S102, a divide module 210e configured to perform step S110, and a determine module 210f configured to perform step S112. In general terms, each functional module 210a-210f may in one embodiment be implemented only in hardware or and in another embodiment with the help of software, i.e., the latter embodiment having computer program instructions stored on the storage medium 230 which when run on the processing circuitry makes the control node 200 perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with functional units 220 and/or 230. The processing circuitry 210 may thus be configured to from the storage medium 230 fetch instructions as provided by a functional module 210a-210f and to execute these instructions, thereby performing any steps as will be disclosed hereinafter.

The control node 200 may be provided as a standalone device or as a part of at least one further device. For example, the control node 200 may be provided in a node of the radio access network 110, in a node of the core network 120, or a in a node of the service network 130. FIGS. 1a and 1b schematically illustrate possible locations of the control node 200. Alternatively, functionality of the control node 200 may be distributed between at least two devices, or nodes. These at least two nodes, or devices, may either be part of the same network part (such as the radio access network 110, the core network 120, or the service network 130) or may be spread between at least two such network parts. In general terms, instructions that are required to be performed in real time may be performed in a device, or node, operatively closer to the network nodes 140a, 140b than instructions that are not required to be performed in real time. In this respect, at least part of the control node 200 may reside in the radio access network 110, such as co-located with one of the network nodes 140a, 140b, for cases when embodiments as disclosed herein are performed in real time.

Thus, a first portion of the instructions performed by the control node 200 may be executed in a first device, and a second portion of the of the instructions performed by the control node 200 may be executed in a second device; the herein disclosed embodiments are not limited to any particular number of devices on which the instructions performed by the control node 200 may be executed. Hence, the methods according to the herein disclosed embodiments are suitable to be performed by a control node 200 residing in a cloud computational environment. Therefore, although a single processing circuitry 210 is illustrated in FIG. 2a the processing circuitry 210 may be distributed among a plurality of devices, or nodes. The same applies to the functional modules 210a-210f of FIG. 2b and the computer program 320 of FIG. 3 (see below).

Figure 3:
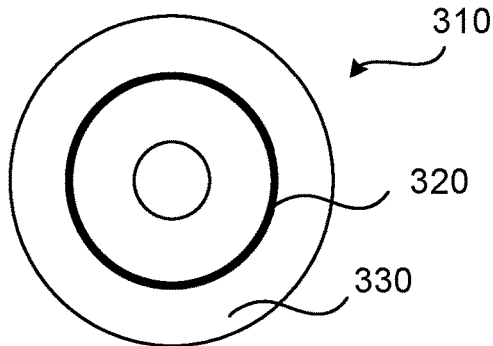
FIG. 3 shows one example of a computer program product comprising computer readable storage medium according to an embodiment.

FIG. 3 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for assigning control plane connectivity (CP) for a wireless device in a dual connectivity supported communications network, wherein the communications network comprises a first network node supporting a group of low frequency bands and a second network node supporting a group of high frequency bands, the method being performed by a control node, the method comprising:
acquiring an uplink load level for the group of low frequency bands;
acquiring a first pathloss level between the wireless device and the first network node and a second pathloss level between the wireless device and the second network node; and
selecting which one of the first network node and the second network node to provide control plane connectivity (CP) for the wireless device,
wherein said selecting takes into consideration each of the uplink load level for the group of low frequency bands, the first pathloss level, and the second pathloss level.

2. The method according to claim 1, wherein the first network node is selected to provide the control plane connectivity (CP) when the uplink load level for the group of low frequency bands is below a first predetermined level.

3. The method according to claim 2, wherein the first predetermined level is based on uplink performance statistics in the communications network.

4. The method according to claim 2, wherein the group of low frequency bands has a first bandwidth, and the group of high frequency bands has a second bandwidth, and wherein at least one of the first predetermined level and a second predetermined level is based on a ratio of the first bandwidth and the second bandwidth.

5. The method according to claim 1, wherein which one of the first network node and the second network node to provide control plane connectivity (CP) is selected based on the first pathloss level and the second pathloss level when the uplink load level for the group of low frequency bands is above a first predetermined level.

6. The method according to claim 1, wherein the second network node is selected to provide the control plane connectivity (CP) when the second pathloss level is below a second predetermined level.

7. The method according to claim 6, wherein the second predetermined level is based on uplink performance statistics in the communications network.

8. The method according to claim 1, wherein the first network node is selected to provide the control plane connectivity (CP) when the first pathloss level and the second pathloss level both are above a second predetermined level.

9. The method according to claim 1, wherein which one of the first network node and the second network node to provide control plane connectivity (CP) is randomly selected when the first pathloss level and the second pathloss level both are below a second predetermined level.

10. The method according to claim 1, wherein at least one of the first network node and the second network node simultaneously provides control plane connectivity (CP) for at least one wireless device and data plane connectivity for at least one other wireless device.

11. The method according to claim 1, wherein frequency bands located lower than 1 GHz belong to the group of low frequency bands, wherein frequency bands located at 4 GHz or higher belong to the group of high frequency bands, and wherein frequency bands located from 1 GHz to 4 GHz either belong to the group of low frequency bands or to the group of high frequency bands.

12. The method according to claim 1, wherein the one of the first network node and the second network node that is not selected to provide control plane connectivity (CP) to the wireless device is selected to provide user plane connectivity (UP) to the wireless device.

13. The method according to claim 1, wherein which one of the first network node and the second network node to provide control plane connectivity (CP) for the wireless device is iteratively selected.

14. The method according to claim 1, wherein the selecting further comprises:
dividing the group of frequency bands for the selected network node into a further group of low frequency bands and a further group of high frequency bands; and
determining, from the acquired uplink load level and pathloss level of the selected network node, which of the further group of low frequency bands and the further group of high frequency bands to utilize for providing the control plane connectivity (CP) for the wireless device.

15. The method according to claim 1, wherein the selecting of which one of the first network node and the second network node to provide control plane connectivity (CP) for the wireless device is performed during dual connectivity of the wireless device, or as part of setting up dual connectivity for the wireless device.

16. A control node for assigning control plane connectivity (CP) for a wireless device in a dual connectivity supported communications network, wherein the communications network comprises a first network node supporting a group of low frequency bands and a second network node supporting a group of high frequency bands, the control node comprising processing circuitry, the processing circuitry being configured to cause the control node to:
acquire an uplink load level for the group of low frequency bands;
acquire a first pathloss level between the wireless device and the first network node and a second pathloss level between the wireless device and the second network node; and
select which one of the first network node and the second network node to provide control plane connectivity (CP) for the wireless device,
wherein the processing circuitry selects which one of the first network node and the second network node taking into consideration each of the acquired uplink load level for the group of low frequency bands, the first pathloss level, and the second pathloss level.

17. A control node for assigning control plane connectivity (CP) for a wireless device in a dual connectivity supported communications network, wherein the communications network comprises a first network node supporting a group of low frequency bands and a second network node supporting a group of high frequency bands, the control node comprising:
processing circuitry; and
a computer program product storing instructions that, when executed by the processing circuitry, causes the control node to:
acquire an uplink load level for the group of low frequency bands;
acquire a first pathloss level between the wireless device and the first network node and a second pathloss level between the wireless device and the second network node; and
select which one of the first network node and the second network node to provide control plane connectivity (CP) for the wireless device,
wherein the control node selects which one of the first network node and the second network node taking into consideration each of the acquired uplink load level for the group of low frequency bands, the first pathloss level, and the second pathloss level.

18. A control node for assigning control plane connectivity (CP) for a wireless device in a dual connectivity supported communications network, wherein the communications network comprises a first network node supporting a group of low frequency bands and a second network node supporting a group of high frequency bands, the control node comprising:
a load level acquire module executed by a processor, configured to acquire an uplink load level for the group of low frequency bands;
a pathloss level acquire module executed by the processor, configured to acquire a first pathloss level between the wireless device and the first network node and a second pathloss level between the wireless device and the second network node; and
a select module executed by the processor, configured to select which one of the first network node and the second network node to provide control plane connectivity (CP) for the wireless device,
wherein select module executed by the processor selects taking into consideration each of the uplink load level for the group of low frequency bands, the first pathloss level, and the second pathloss level.

19. A non-transitory computer readable storage medium comprising a computer program for assigning control plane connectivity (CP) for a wireless device in a dual connectivity supported communications network, wherein the communications network comprises a first network node supporting a group of low frequency bands and a second network node supporting a group of high frequency bands, the computer program comprising computer code which, when run on processing circuitry of a control node, causes the control node to:
acquire an uplink load level for the group of low frequency bands;
acquire a first pathloss level between the wireless device and the first network node and a second pathloss level between the wireless device and the second network node; and
select which one of the first network node and the second network node to provide control plane connectivity (CP) for the wireless device,
wherein the control node selects which one of the first network node and the second network node taking into consideration a combination of the acquired uplink load level for the group of low frequency bands, the first pathloss level, and the second pathloss level.

* * * * *